UNITED STATES PATENT OFFICE.

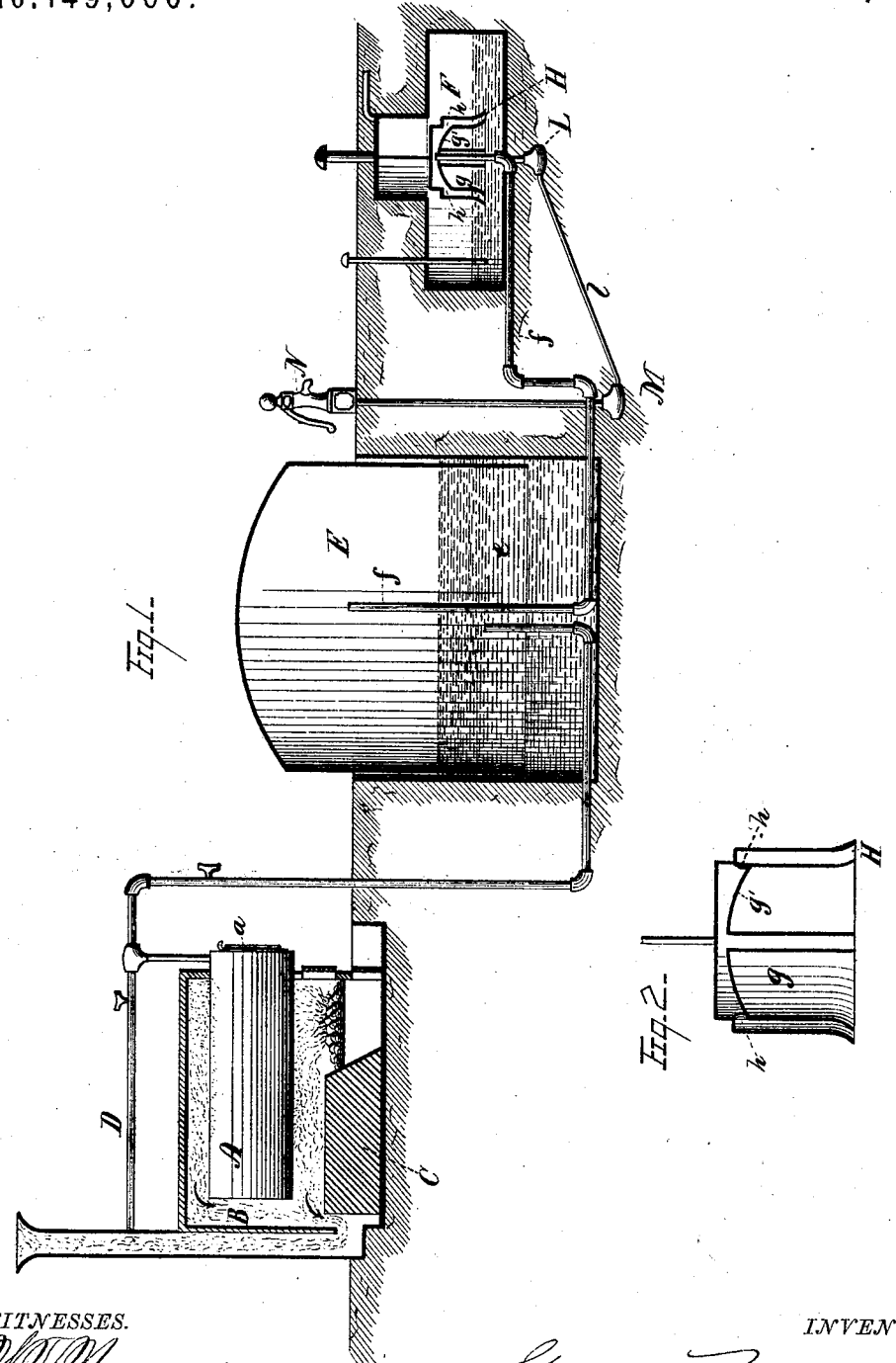

GEORGE RAMSDELL, OF DETROIT, MICHIGAN.

IMPROVEMENT IN THE MANUFACTURE OF WOOD-GAS.

Specification forming part of Letters Patent No. 149,060, dated March 31, 1874; application filed March 21, 1874.

*To all whom it may concern:*

Be it known that I, GEORGE RAMSDELL, of Detroit, in the county of Wayne and State of Michigan, have invented certain new and useful Improvements in the Process of Making Wood-Gas; and I do hereby declare the following to be a full, clear, and exact description of the invention, such as will enable others skilled in the art to which it pertains to make and use it, reference being had to the accompanying drawings, which form part of this specification.

My invention relates to a new process for making wood-gas, or gas from vegetable substances; and consists essentially in the combination of steps or procedures executed in a prescribed order, as will hereinafter more fully appear.

In the drawings, Figure 1 is a view of a machine illustrating my process of making the wood-gas, or gas from vegetable substances. Fig. 2 is a separate view of a float that I employ in the carbureting-chamber.

A is a retort, provided with a close door, $a$, and situated in a chamber or furnace, B. A wall, C, of masonry, and a partition-wall, C, adjacent to the smoke-stack, serve to cause the products of combustion to circulate freely around the retort A, and to expend the greatest amount of heat upon it before escaping through the smoke-flue. D is a pipe, through which the gaseous products are conveyed from the retort A through the water $e$ into the gas-holder E. The gas-holder E is of ordinary construction, open at the bottom and floated in a tank of water. The gaseous products are admitted into this water at the bottom of the tank and bubble through it, by which procedure it is thoroughly washed and cleansed of impurities. Collecting in the upper part of this holder E, the gaseous products are conveyed through a pipe, $f$, that projects above the water $e$ into a separate chamber, F, containing hydrocarbon. The pipe $f$ as it enters the chamber F passes up through and above the hydrocarbon into a float, G. This float is buoyed by the air contained in the cavity $g$ beneath the dome-shaped partition $g'$. It has no bottom, but has a central tube, through which the pipe $f$ passes, and discharges the gaseous products into the chamber of the float that is above the dome-partition $g'$. At the outer edges of this dome-partition, and close to the partition, are small openings $h$ through the outer wall of the float, and the gaseous products passing out through them are conveyed downward through the casing or tubes H into the hydrocarbon, and in bubbling up through the latter into the chamber K take on their carbon and are ready for use.

The form of this float G may be varied without altering the principle of my invention, or other means may be employed for forcing the gaseous products through the hydrocarbon. However, I prefer to use a float, and in employing the latter I prefer such a one as is here shown and described.

The object of the dome-shaped partition is to collect upon it the sediment or drip, and direct it outward and downward, instead of throwing it back into the pipe F. I also attach a series of drips connected by a pipe that I term a double drip, as is illustrated in the drawings. L is a drip-box placed at the joint beneath the float. $l$ is a pipe connecting this drip-box with a similar box, M, situated in the pipe $f$ near the gas-holder, and at this point I place a pump, N, by which the drip may be pumped away.

Having thus described my invention, what I claim is—

1. The process of making wood-gas, or gas from vegetable substances, by the successive operations executed as follows: First, by subjecting the substance to heat in a retort; second, conveying the gaseous products thence through water; third, conveying the gaseous products therefrom through hydrocarbon contained in a separate vessel, all substantially as described.

2. In combination with the pipe $f$, the double drip, composed of drip-boxes L and M, pipe $l$, and pump N, substantially as described.

3. The float G, with open bottom and central tube, provided with dome-shaped partition $g'$, perforations $h$, and downward conduits H, in combination with the pipe $f$, substantially as set forth and shown.

In testimony that I claim the foregoing I have hereunto set my hand this 19th day of March, 1874.

GEORGE RAMSDELL.

Witnesses:
J. TYLER POWELL,
ROBT. M. BARR.